(12) United States Patent
Wetzel et al.

(10) Patent No.: US 6,498,977 B2
(45) Date of Patent: Dec. 24, 2002

(54) DEVICE AND METHOD FOR STABILIZING A COMBINATION OF A TRACTOR VEHICLE AND AT LEAST ONE SEMITRAILER OR TRAILER

(75) Inventors: Gabriel Wetzel, Stuttgart (DE); Ian Faye, Stuttgart (DE); Klaus-Dieter Leimbach, Eschach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/753,375

(22) Filed: Jan. 2, 2001

(65) Prior Publication Data

US 2001/0018630 A1 Aug. 30, 2001

(30) Foreign Application Priority Data

Dec. 30, 1999 (DE) ........................................ 199 64 164

(51) Int. Cl.[7] ............................................. B62D 53/04
(52) U.S. Cl. ................ 701/70; 303/7; 303/93; 303/100; 303/105; 280/432; 280/408; 280/446
(58) Field of Search ................ 701/70; 280/432, 280/408, 423, 446; 303/100, 93, 7, 105

(56) References Cited

U.S. PATENT DOCUMENTS

| | | | | |
|---|---|---|---|---|
| 3,740,076 A | * | 6/1973 | Cupp | 280/432 |
| 4,060,284 A | * | 11/1977 | Steiner | 303/100 |
| 4,106,792 A | * | 8/1978 | Schultz et al. | 280/432 |
| 4,688,818 A | * | 8/1987 | Grassmuck | 280/432 |
| 5,380,072 A | * | 1/1995 | Breen | 303/7 |
| 5,523,947 A | * | 6/1996 | Breen | 280/400 |

FOREIGN PATENT DOCUMENTS

| | | | |
|---|---|---|---|
| DE | 25 47 487 | 4/1977 | 152/367 |
| DE | 40 26 627 | 2/1992 | 439/377 |
| DE | 40 30 653 | 4/1992 | 227/25 |

OTHER PUBLICATIONS

Zanten et al., *Driving Dynamics Control from Bosch*, ATZ Automobiltechnische Zeitschrift, 96 (1994) 11, pp. 674–689, Nov. 1994.*

Hecker et al., *Vehicle Dynamics Controller for Commercial Vehicles*, SAE Paper 973284, Nov. 1997.*

* cited by examiner

*Primary Examiner*—William A. Cuchlinski, Jr.
*Assistant Examiner*—Tuan C To
(74) *Attorney, Agent, or Firm*—Kenyon & Kenyon

(57) ABSTRACT

A device and a method for stabilizing a combination of a tractor vehicle and at least one semitrailer or trailer is described, where the trailer or semitrailer is automatically braked if the semitrailer or trailer buckles with respect to the tractor vehicle at a buckling rate which is greater than a predetermined limit buckling rate.

3 Claims, 6 Drawing Sheets

DEVICE AND METHOD FOR STABILIZING A COMBINATION OF A TRACTOR VEHICLE AND AT LEAST ONE SEMITRAILER OR TRAILER

FIELD OF THE INVENTION

The present invention relates to a device and a method for stabilizing a combination of a tractor vehicle, which may be a passenger vehicle or truck, and at least one semitrailer or trailer, which may be a truck trailer for a poassenger vehicle, e.g., a caravan.

BACKGROUND INFORMATION

German Published Patent Application No. 25 47 487 describes a device for stabilizing a vehicle having at least one guiding part and one pushing part. The pushing part is connected to the guiding part by a joint. The device has a measuring sensor for sampling the buckling angle that occurs between the guiding part and the pushing part. Furthermore, a measuring sensor is also provided for detecting the steering angle. The device includes an analyzer circuit which receives the signals from the two measuring sensors and generates an output signal when the buckling angle exceeds a certain angle size which depends on the steering angle. The certain angle sizes correspond to the buckling angles determined as a function of the steering angle and permitted on the basis of the prevailing driving situation. Furthermore, this device includes an apparatus for automatic control of a brake pressure of at least one axle of the pushing part, which is actuated according to the output signal of the analyzer circuit.

SUMMARY OF THE INVENTION

An object of the present invention is to provide an improved device and an improved method for stabilizing a combination of a tractor vehicle and at least one semitrailer or trailer.

This object is achieved by a device and by a method according to the present invention. To stabilize a combination of a tractor vehicle and at least one semitrailer or trailer, the semitrailer or trailer is braked (automatically) if the semitrailer or trailer buckles with respect to the tractor vehicle at a buckling rate whose value or absolute value is greater than a predetermined limit buckling rate. The trailer or semitrailer is then braked in particular when the following equation holds:

$$\Delta\dot\psi > \Delta\dot\psi_{lim}, \text{ when } \Delta\psi > 0$$

or $$\Delta\dot\psi < -\Delta\dot\psi_{lim}, \text{ when } \Delta\psi < 0$$

where $\Delta\dot\psi$ is the buckling rate of the semitrailer or trailer with respect to the tractor vehicle, $\Delta\dot\psi_{lim}$ is the limit buckling rate of the semitrailer or trailer with respect to the tractor vehicle and $\Delta\psi$ is the buckling angle of the semitrailer or trailer with respect to the tractor vehicle. The buckling angle of the trailer or semitrailer with respect to the tractor vehicle is defined here as $$\Delta\psi = \psi_z - \psi_a$$

where $\psi_z$ is the yaw angle of the tractor vehicle and $\psi_a$ is the yaw angle of the trailer or semitrailer.

The buckling angle is measured according to German Published Patent Application No. 25 47 487, for example.

A better stabilization of the combination of a tractor vehicle and trailer or semitrailer is achieved by automatic braking of the trailer or semitrailer when the trailer or semitrailer buckles with respect to the tractor vehicle at a buckling rate which is greater than a predetermined limit buckling rate.

If there is a higher-level brake command, e.g., due to operation of the brake by the driver of the combination, then the trailer or semitrailer is considered as braked in the sense of the present invention only if it is braked more strongly than the tractor vehicle.

In an advantageous embodiment of the present invention, the trailer or semitrailer is braked if:

$$\Delta\psi > \Delta\psi^*, \text{ when } \Delta\psi > 0$$

or $$\Delta\psi < \Delta\psi^*, \text{ when } \Delta\psi < 0$$

where $\Delta\psi$ is the buckling angle and $\Delta\psi^*$ is the preselected setpoint buckling angle.

The combination is also stabilized in this way.

Another improvement in the stabilization of the combination is achieved in an advantageous embodiment of the present invention by braking the trailer or semitrailer if a transverse force acts on the semitrailer or trailer in the direction of an increase in the buckling angle or if the angle of inclination and the buckling angle have the same operational sign. Detection of transverse force and angle of inclination are described in, for example, German Published Patent Application No. 40 26 627 and German Published Patent Application No. 40 30 653. The transverse force is the actual quantity to be analyzed. However, since the transverse force can be determined only in a relatively complicated procedure, the angle of inclination is instead used as an "equivalent quantity" and an angle of inclination is determined for the trailer or semitrailer.

Tire force sensors or sidewall sensors are known. These involve vehicle tires having magnetic surfaces vulcanized into the side walls. These magnetic surfaces pass by induction sensors during rotation of the tire, thereby generating electrical signals. With an appropriate analysis, the transverse forces prevailing on the individual tires, among other things, can be determined from these signals.

If the information about the transverse force is available, then the method and the device according to the present invention can be simplified so that no buckling angle sensor is used. Instead, the buckling angle would be determined as follows: the yaw rate of the semitrailer is determined from the transverse force. This requires, in addition to the transverse force acting on the semitrailer, the float angle of the tractor vehicle, the buckling angle (of the preceding increment of time), the yaw rate of the tractor vehicle plus various geometric quantities. The buckling rate is determined from the yaw rate of the semitrailer and the yaw rate of the tractor vehicle (measured with the yaw rate sensor). Then the buckling angle is calculated from the buckling rate by integration. This value of the buckling angle is taken into account in the next time increment.

In another advantageous embodiment of the present invention, the trailer or semitrailer is braked if:

$$\dot{\psi}_z > \dot{\psi}_z^*, \text{ when } \Delta\psi > 0$$

or $$\dot{\psi}_z < \dot{\psi}_z^*, \text{ when } \Delta\psi < 0$$

where $\dot{\psi}_z$ is the yaw rate of the tractor vehicle and $\dot{\psi}_z^*$ is the setpoint yaw rate of the tractor vehicle.

An example of calculating the setpoint yaw rate of the tractor vehicle from the velocity of the combination and the steering angle has been published in the article "FDR—die Fahrdynamikreglung von Bosch [FDR—Driving Dynamics Control from Bosch]" by A. van Zanten, R. Erhardt and G. Pfaff, in the automotive engineering journal *ATZ Automobiltechnische Zeitschrift*, 96 (1994) 11, pp. 674–689 and the article "Vehicle Dynamics Controller for Commercial Vehicles" by F. Hecker, S. Hummel, O. Jundt, K.-D. Leimbach, I. Faye, H. Schramm, SAE Paper 973284.

In an especially advantageous embodiment of the present invention, the braking process is terminated, in particular immediately after a change in the operational sign of the buckling rate. The combination is stabilized especially well by this measure. By analysis of the buckling rate, the vehicle is prevented from becoming unstable again because of intervention measures that last too long under some circumstances.

As an alternative, a check is performed to determine whether the value of the buckling rate is in a small range around zero. This range is defined by a small value KG1, i.e., the range corresponds to the interval from −KG1 to +KG1. Consequently, braking of the trailer or semitrailer is terminated when the buckling rate is less than +KG1 for a positive buckling rate, or when the buckling rate is greater than −KG1 for a negative buckling rate.

In an especially advantageous embodiment, the present invention works together with a vehicle stabilization system such as that described, for example, in the articles "FDR—Driving Dynamics Control from Bosch" by A. van Zanten, R. Erhardt and G. Pfaff, *ATZ Automobiltechnische Zeitschrift*, 96 (1994) 11, pp. 674–689 and the article "Vehicle Dynamics Controller for Commercial Vehicles" by F. Hecker, S. Hummel, O. Jundt, K.-D. Leimbach, I. Faye, H. Schramm, SAE Paper 973284.

In another advantageous embodiment of the present invention, the at least one trailer or semitrailer is braked essentially the same on both sides.

In an advantageous embodiment, the tractor vehicle is equipped with the sensors used as part of vehicle dynamics control (see "Vehicle Dynamics Controller for Commercial Vehicles" by F. Hecker, S. Hummel, O. Jundt, K.-D. Leimbach, I. Faye, H. Schramm, SAE Paper 973284). Furthermore, the vehicle combination has a buckling angle sensor. The transverse force is calculated, for example, as a function of the yaw rate and the float angle of the tractor vehicle and various geometric parameters.

In an alternative embodiment, the tractor vehicle is equipped with sensors used as part of driving dynamics control. The vehicle combination does not have a buckling angle sensor. The vehicle combination has tire force sensors. The buckling angle is calculated as described above on the basis of the signals supplied by the tire force sensors.

In another alternative embodiment, the vehicle is equipped with the sensors used as part of driving dynamics control. Furthermore, the vehicle combination is equipped with a buckling angle sensor and tire force sensors.

The present invention can be used for hydraulic, electrohydraulic, pneumatic, electropneumatic or electromechanical brake systems.

DETAILED DESCRIPTION

Figure 1:
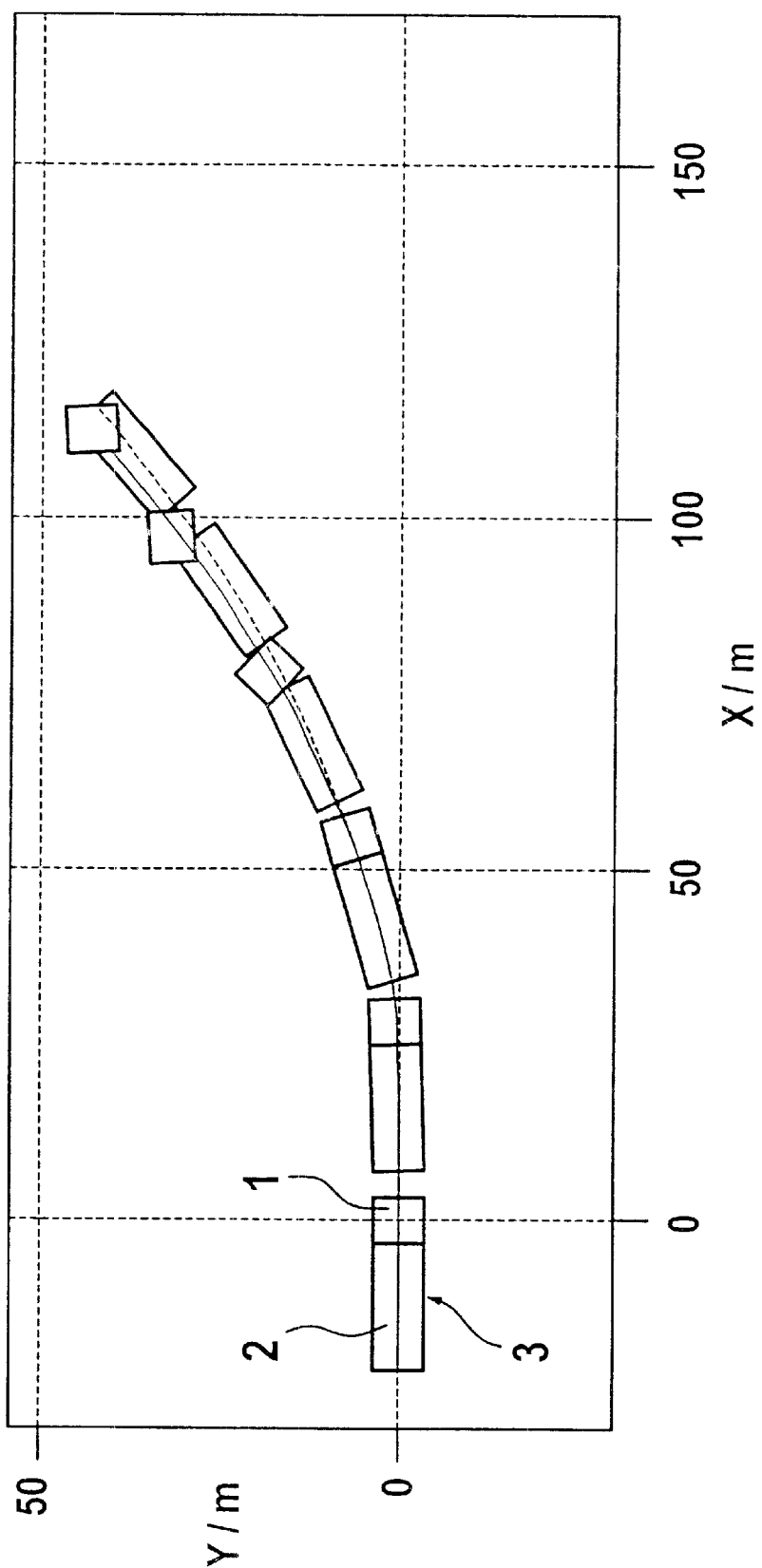
FIG. 1 shows a trajectory of a combination of a tractor vehicle and a semitrailer.

FIG. 1 shows a trajectory of a combination 3 of a tractor vehicle 1 and a semitrailer 2. Both the abscissa X and the ordinate Y are scaled in meters m. Combination 3 is an empty tractor-trailer combination weighing 15 tonnes. The coefficient of friction is 0.2. The starting speed of the tractor-trailer combination is 50 km/h. After 0.5 second, there is a steering angle of 0.052 rad with 0.052 rad/s. Furthermore, the tractor-trailer combination is accelerated briefly. Tractor vehicle 1 has four wheels, a right and left front wheel and a right and left rear wheel. Semitrailer 2 has two wheels.

Figure 2:
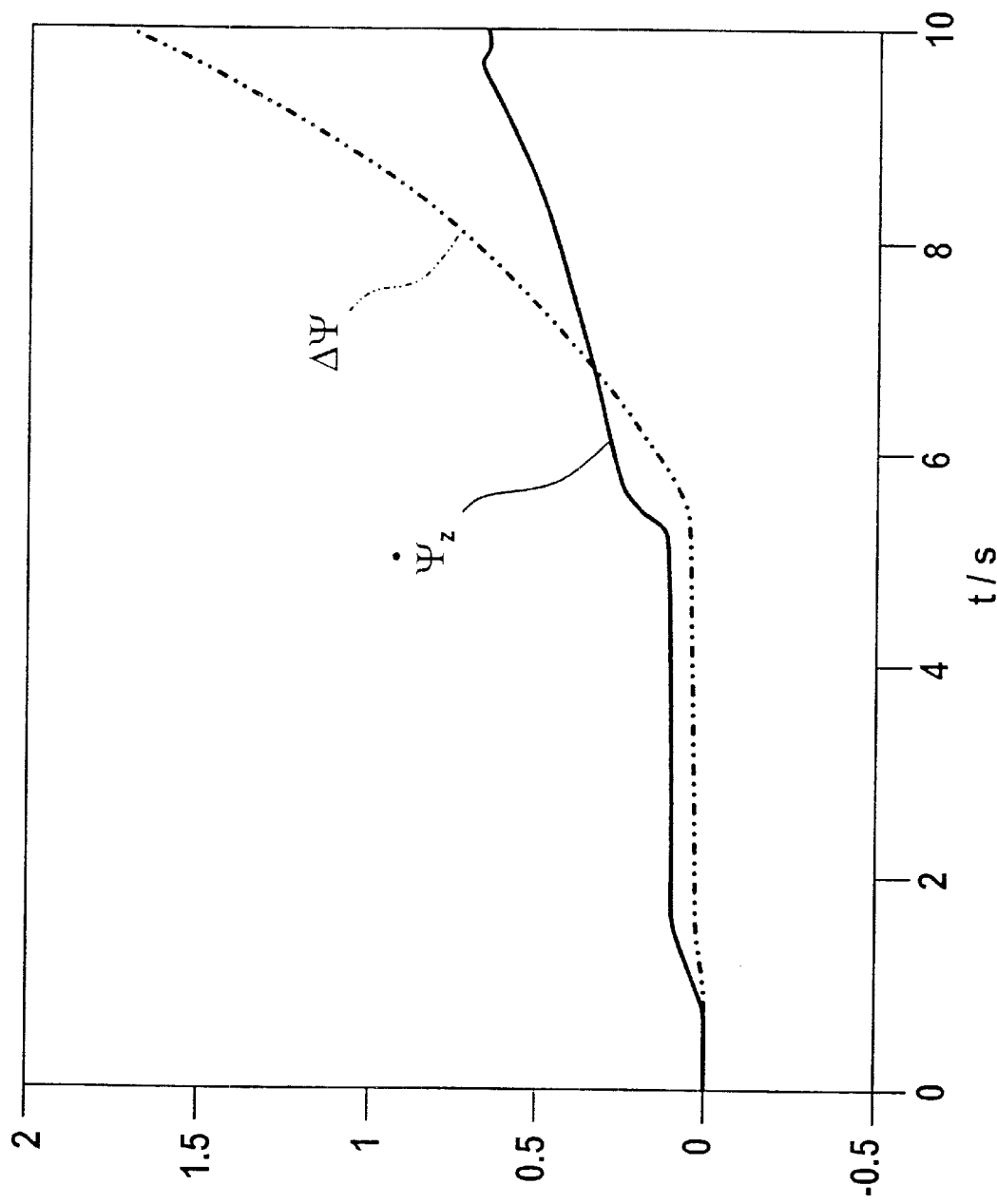
FIG. 2 shows a buckling angle and yaw rate of the tractor vehicle over time.

As FIG. 1 shows, combination 3 becomes unstable after approximately 80 meters and tractor vehicle 1 buckles. The instability of combination 3 is also illustrated in FIG. 2. FIG. 2 shows the buckling angle $\Delta\psi$ and yaw rate $\dot{\psi}_z$ (in rad/s) of tractor vehicle 1 over time. This shows clearly that buckling angle $\Delta\psi$ and yaw rate $\dot{\psi}_z$ of tractor vehicle 1 increase in an uncontrolled manner after about five seconds.

Figure 3:
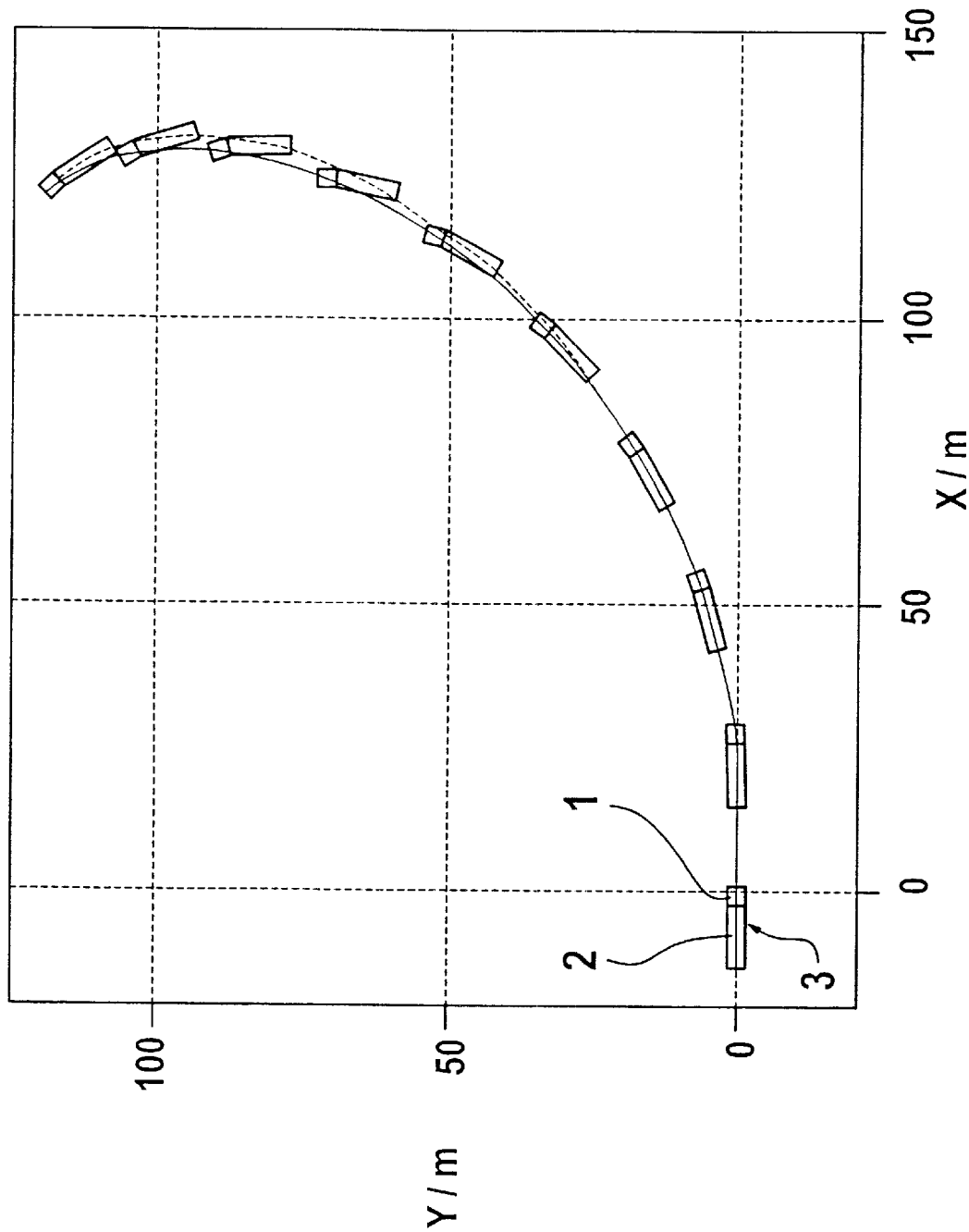
FIG. 3 shows a trajectory of a combination of a tractor vehicle and a semitrailer using the present invention.

FIG. 3 shows the trajectory of combination 3 of tractor vehicle 1 and semitrailer 2 under the same conditions but with the use of the present invention. In addition, tractor vehicle 1 is equipped with driving dynamics control from Bosch, as described, for example, in the articles "FDR—Driving Dynamics Control from Bosch" by A. van Zanten, R. Erhardt and G. Pfaff, *ATZ Automobiltechnische Zeitschrift*, 96 (1994) 11, pp. 674–689 and "Vehicle Dynamics Controller for Commercial Vehicles" by F. Hecker, S. Hummel, O. Jundt, K.-D. Leimbach, I. Faye, H. Schramm, SAE Paper 973284. The trailer or semitrailer 2 is then braked according to this embodiment if:

$$\Delta\dot{\psi} > \Delta\dot{\psi}_{lim}, \text{ when } \Delta\psi > 0$$

and $$\Delta\psi > \Delta\psi^*, \text{ when } \Delta\psi > 0$$

or $$\Delta\dot{\psi} < -\Delta\dot{\psi}_{lim}, \text{ when } \Delta\psi<0$$

and $$\Delta\psi < \Delta\psi^*, \text{ when } \Delta\psi<0$$

where

- $\Delta\dot{\psi}$ is the buckling rate of the trailer or semitrailer 2 with respect to the tractor vehicle 1,
- $\Delta\dot{\psi}_{lim}$ is the limit buckling rate of the trailer or semitrailer 2 with respect to the tractor vehicle 1;
- $\Delta\psi$ is the buckling angle of the trailer or semitrailer 2 with respect to the tractor vehicle 1; and
- $\Delta\psi^*$ is the predetermined setpoint buckling angle of the trailer or semitrailer 2 with respect to the tractor vehicle 1.

The limit buckling rate is stored in the controller in the form of a characteristic curve or in the form of an engine characteristics map (multidimensional characteristic curve). The characteristic curve or the engine characteristics map is determined in advance, i.e., as part of the application through driving tests and theoretical considerations. To do so, the performance of the vehicle in various driving situations (various vehicle speeds, steering angles, coefficients of friction of the roadway surface) is analyzed with respect to the values established for the limit buckling rate, i.e., the values of the limit buckling rate which characterize an incipient instability of the vehicle combination or where the vehicle combination begins to be unstable are determined. These values are then stored in the form of a characteristic curve or in the form of an engine characteristics map. Then, during operation of the vehicle, the vehicle speed and steering angle and coefficient of friction of the roadway surface are determined continuously and are used as input quantities for the characteristic curve or the engine characteristics map. Then the limit buckling rate which "fits" the prevailing driving situation is determined as a function of these input quantities.

Figure 4:
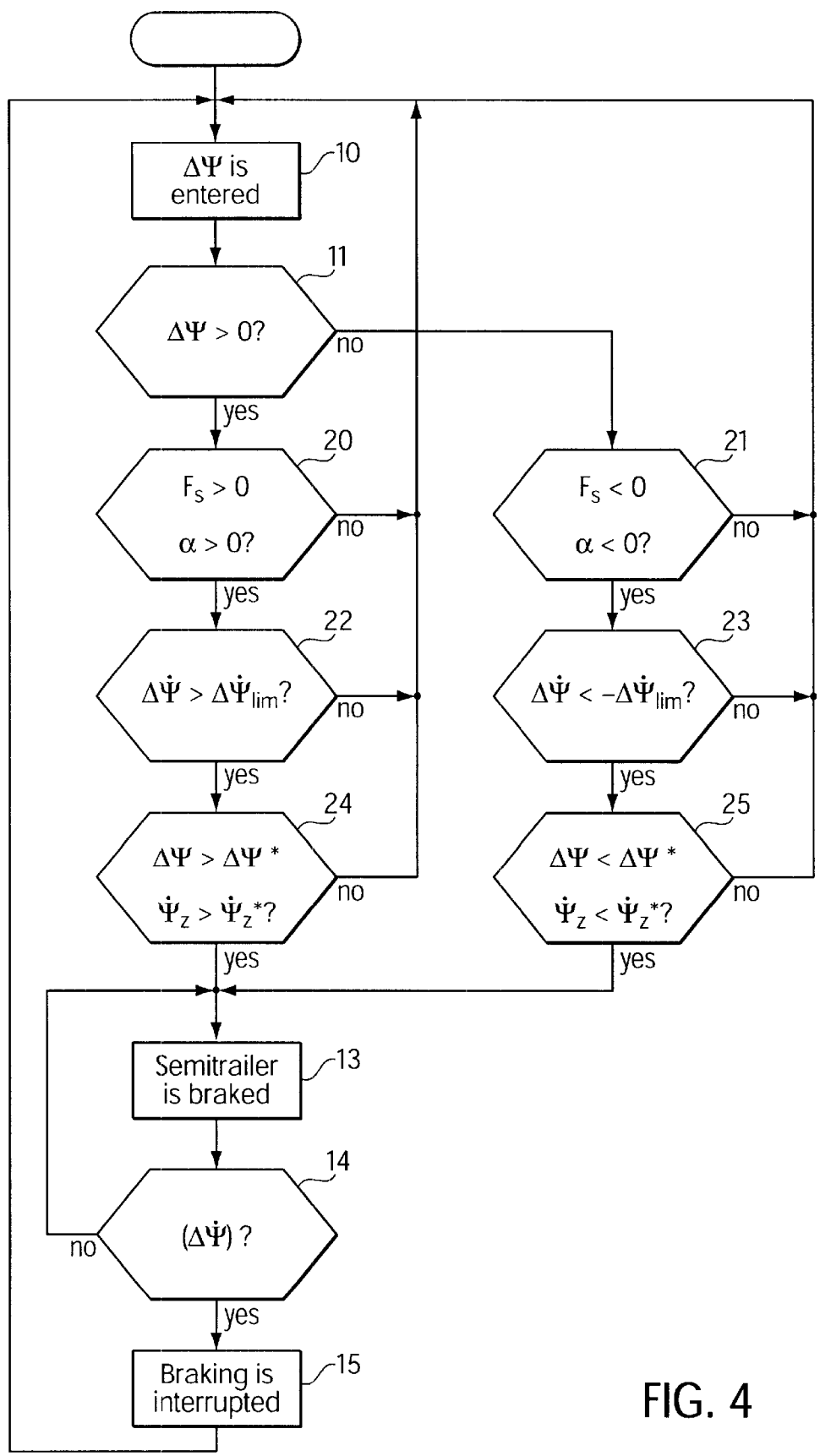
FIG. 4 shows an embodiment of the present invention.

FIG. 4 shows a flow chart for such a procedure. First, a value for the buckling angle $\Delta\psi$ is entered in a step 10. This value is differentiated (step 10) to obtain a buckling rate $\Delta\dot{\psi}$. As an alternative, the buckling rate $\Delta\dot{\psi}$ is measured and entered in step 10. Furthermore, the setpoint buckling angle $\Delta\psi^*$ is determined. The setpoint buckling angle is formed as a function of the following quantities: geometric quantities (length of the semitrailer 2 and the tractor vehicle 1; the center of gravity of the tractor vehicle 1 and the semitrailer 2; the distance between the kingpin and the rear axle of the tractor vehicle 1), weight quantities (weight of the tractor vehicle 1 and the trailer or semitrailer 2), lateral rigidity for the various axles of the vehicle combination 3 (including the rigidity of each tire), the longitudinal velocity of the vehicle combination 3 and the steering angle chosen by the driver.

Step 10 is followed by a query 11 as to whether $$\Delta\psi>0.$$

If this condition is met, there is a query 20. However, if this condition is not met, there is a query 21.

Query 20 asks whether $$\alpha>0$$

or (and/or) whether $$F_s>0$$

where $\alpha$ is the angle of inclination and $F_s$ is the transverse force. If the queried condition is not met, then step 10 is carried out again. However, if the queried condition is met, there follows a query 22, which asks whether $$\Delta\dot{\psi}>\Delta\dot{\psi}_{lim}$$

If this condition is not met, step 10 is carried out again. However, if this condition is met, there is a query 24 which asks whether $$\Delta\psi>\Delta\psi^*$$

or (and/or) whether $$\Delta\dot{\psi}>\Delta\dot{\psi}_z^*$$

The query with respect to the inequality $$\Delta\psi>\Delta\psi^*$$

together with the preceding queries is to be assigned to "anti-jackknifing," where the angle of inclination (or the transverse force), the buckling rate and the buckling angle are analyzed.

However, the query with regard to the inequality $$\dot{\psi}_z>\dot{\psi}_z^*$$

together with the preceding queries is to be assigned to "anti-oversteering," where the angle of inclination (or the transverse force), the buckling rate and the yaw rate of the tractor vehicle are analyzed.

If the conditions of query 24 are not met, step 10 is carried out again. If these conditions are met, semitrailer 2 is braked (step 13).

Query 21 asks whether $$\alpha<0$$

or (and/or) whether $$F_s<0$$

If the queried condition is not met, step 10 is carried out again. However, if the queried condition is met, a query 23 is carried out, asking whether $$\Delta\dot{\psi}<-\Delta\dot{\psi}_{lim}$$

If this condition is not met, step 10 is carried out again. However, if this condition is met, there follows a query 25 which asks whether $$\Delta\psi<\Delta\psi$$

or (and/or) whether $$\dot{\psi}_z<\dot{\psi}_z^*$$

The query with respect to the inequality $$\Delta\psi<\Delta\psi^*$$

together with the preceding queries is to be assigned to "anti-jackknifing." The query with regard to the inequality $$\dot{\psi}_z<\dot{\psi}_z^*$$

together with the preceding queries is to be assigned to "anti-oversteering."

If the conditions of query 25 are not met, step 10 is carried out again. If these conditions are met, semitrailer 2 is braked (step 13).

In an alternative embodiment, query 20 or 21 and/or query 24 or 25 may be omitted.

Step 13 is followed by a query 14 to determine whether there has been a change in the operational sign of the buckling rate. If there is no change in sign of the buckling rate, the semitrailer 2 is still braked. However, braking is interrupted (step 15) if there has been a change in the sign of the buckling rate. Then step 10 is carried out again. For example, the flow chart shown in FIG. 4 is implemented on a processing device (braking means).

As FIG. 3 shows, the present invention is especially suitable for stabilizing a combination 3 of a tractor vehicle 1 and a semitrailer 2.

Figure 5:
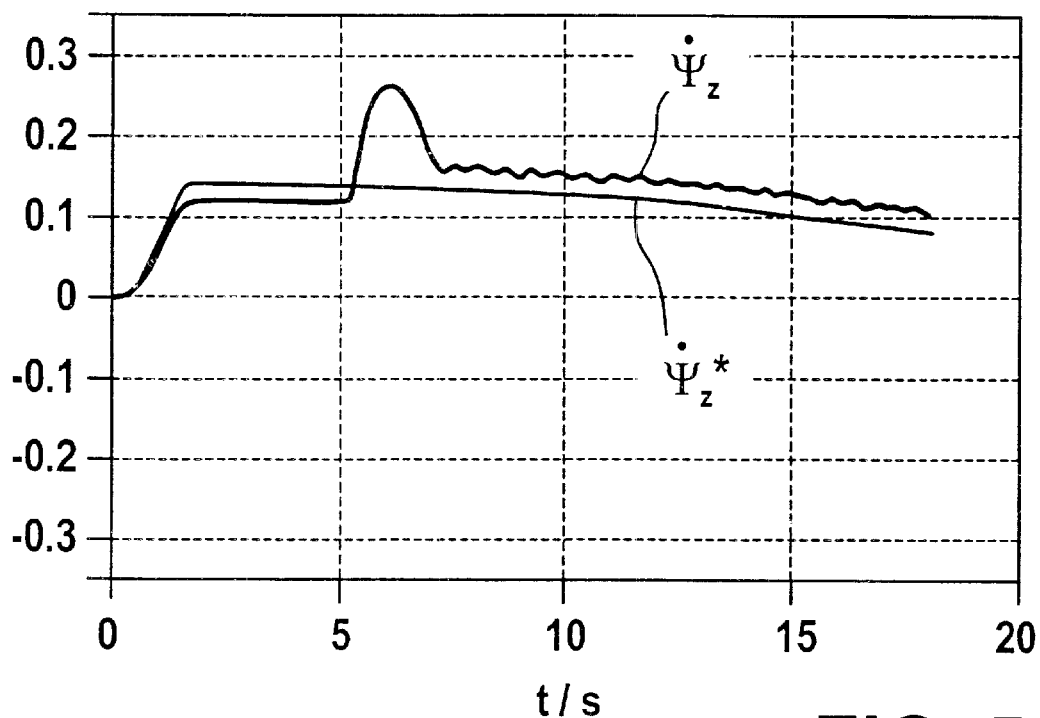
FIG. 5 shows the yaw rate of the tractor vehicle and the setpoint yaw rate of the tractor vehicle.

FIG. 5 shows yaw rate $\Delta\psi$ of tractor vehicle 1 and setpoint yaw rate $\dot\psi_z^*$ of tractor vehicle 1 for the trajectory of combination 3 in FIG. 3 over time t. Although the yaw rate $\dot\psi_z$ of tractor vehicle 1 increases in an uncontrolled manner without the use of the present invention (see FIG. 2), the procedure according to the present invention stabilizes tractor vehicle 1 after six seconds: the yaw rate $\dot\psi_z$ of tractor vehicle 1 decreases, approaching its setpoint $\dot\psi_z^*$.

Figure 6:
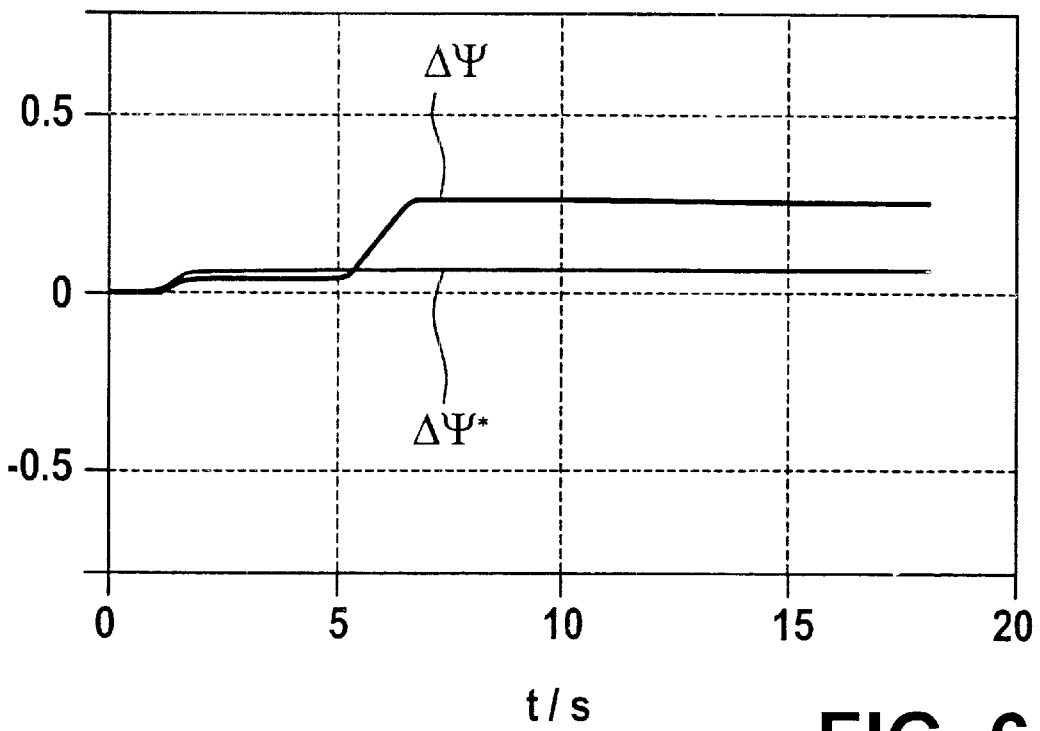
FIG. 6 shows the buckling angle and the setpoint buckling angle.

As shown in FIG. 6, the situation is similar for buckling angle $\Delta\psi$. Buckling angle $\Delta\psi$ does not increase further after about six seconds, but instead stabilizes in the range of its setpoint $\Delta\psi^*$.

Figure 7:
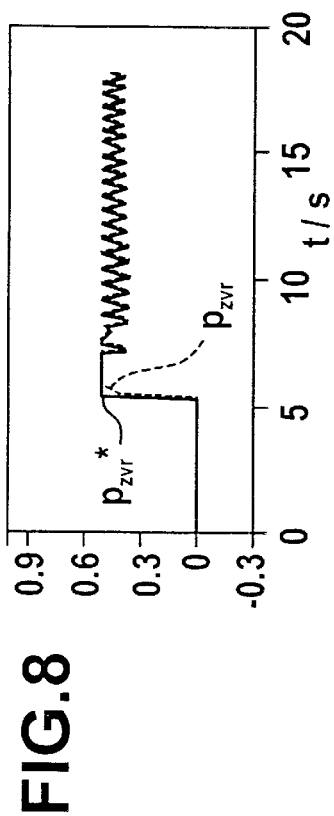
FIG. 7 shows the brake pressure and its setpoint for the left front wheel of the tractor vehicle.
Figure 8:
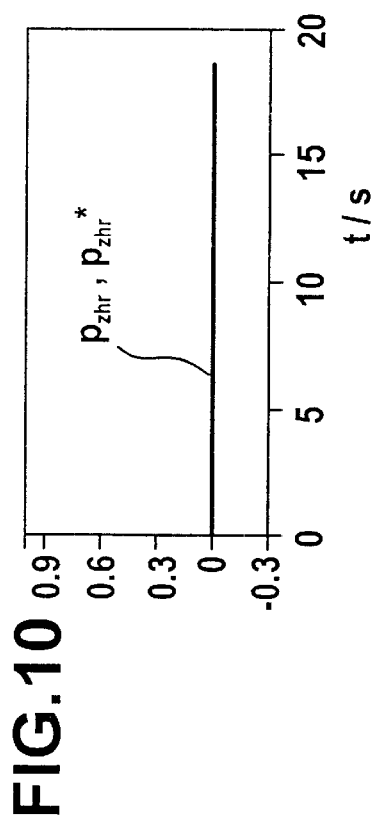
FIG. 8 shows the brake pressure and its setpoint for the right front wheel of the tractor vehicle.
Figure 9:
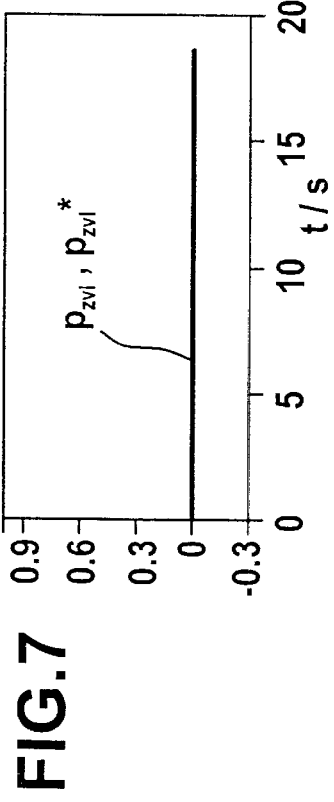
FIG. 9 shows the brake pressure and its setpoint for the left rear wheel of the tractor vehicle.
Figure 10:
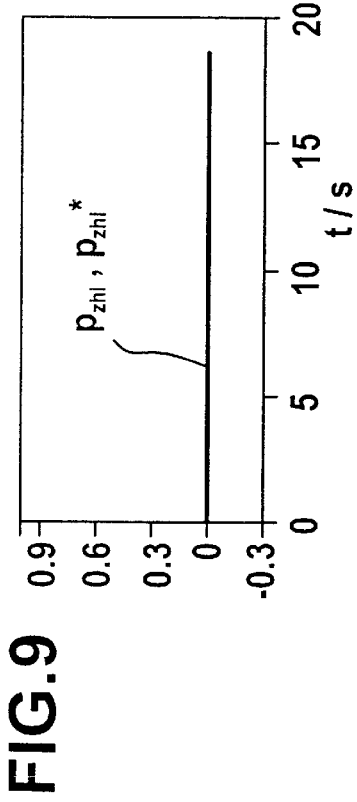
FIG. 10 shows the brake pressure and its setpoint for the right rear wheel of the tractor vehicle.
Figure 11:
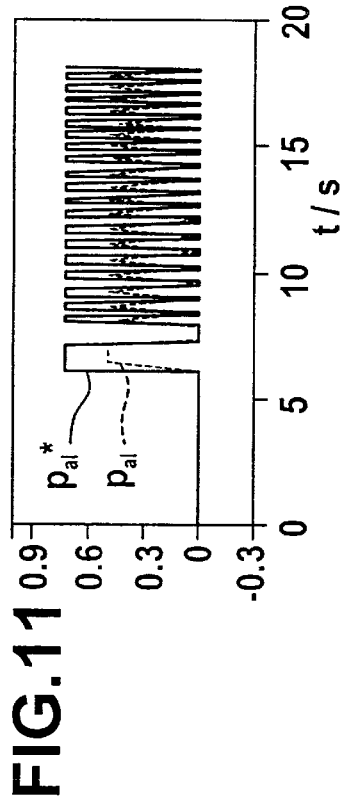
FIG. 11 shows the brake pressure and its setpoint for the left wheel of the semitrailer.
Figure 12:
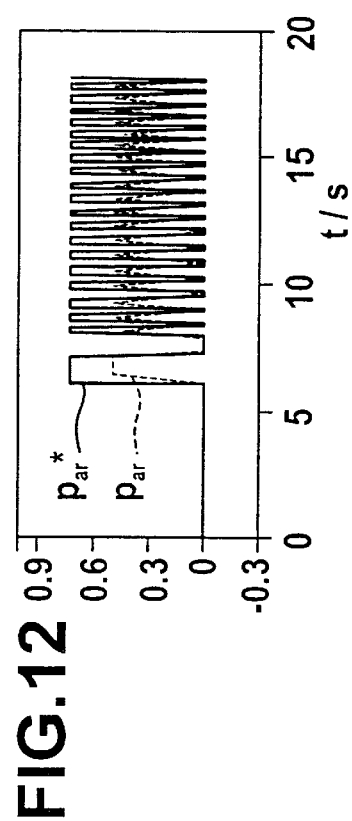
FIG. 12 shows the brake pressure and its setpoint for the right wheel of the semitrailer.

FIGS. 7 through 12 show the brake pressures for the wheels of combination 3. FIG. 7 shows brake pressure $p_{zvl}$ and its setpoint $p_{zvl}^*$ for the left front wheel of tractor vehicle 1. FIG. 8 shows brake pressure $p_{zvr}$ (dotted line) and its setpoint $p_{zvr}^*$ (solid line) for the right front wheel of tractor vehicle 1; FIG. 9 shows brake pressure $p_{zhl}$ and its setpoint $p_{zhl}^*$ for the left rear wheel of tractor vehicle 1; FIG. 10 shows brake pressure $p_{zhr}$ and its setpoint $p_{zhr}^*$ for the right rear wheel of tractor vehicle 1; FIG. 11 shows brake pressure $p_{al}$ (dotted line) and its setpoint $p_{al}^*$ solid line) for the left wheel of semitrailer 2; FIG. 12 shows brake pressure $p_{ar}$ (dotted line) and its setpoint $p_{ar}^*$ (solid line) for the right wheel of semitrailer 2.

As shown in FIGS. 7, 9 and 10, the left front wheel, the left rear wheel and the right rear wheel of tractor vehicle 1 remain unbraked. However, the right front wheel of tractor vehicle 1 is braked after about five seconds. This brake command for the right front wheel of tractor vehicle 1 comes from the driving dynamics control (FDR). As shown by FIGS. 11 and 12, the two wheels of semitrailer 2 are braked equally.

The brake command is always issued when the buckling rate $\Delta\dot\psi$ is greater than a predetermined limit buckling rate $\Delta\dot\psi_{lim}$ and at the same time the buckling angle $\Delta\psi$ between the tractor vehicle 1 and semitrailer 2 is greater than a predetermined setpoint buckling angle $\Delta\psi^*$. The braking operation is terminated immediately after a change in sign of the buckling rate $\Delta\dot\psi$.

The high switching frequency of the brake pressure as shown in FIGS. 11 and 12 can be reduced by a hysteresis in the limit buckling rate.

What is claimed is:

1. A method of stabilizing a combination of a tractor vehicle and one of at least one semitrailer and a trailer, the method comprising the step of:

braking the one of the-at least one semitrailer and the trailer if the one of the at least one semitrailer and the trailer buckles with respect to the tractor vehicle at a buckling rate that is greater than a predetermined limit buckling rate, wherein the step of braking is performed if one of:

a transverse force acts on the one of the at least one semitrailer and the trailer in a direction of an increase in a buckling angle, and an angle of inclination and the buckling angle have the same operational sign.

2. A method of stabilizing a combination of a tractor vehicle and one of at least one semitrailer and a trailer, the method comprising the steps of:

braking the one of the at least one semitrailer and the trailer if the one of the at least one semitrailer and the trailer buckles with respect to the tractor vehicle at a buckling rate that is greater than a predetermined limit buckling rate; and terminating the braking after a change occurs in an operational sign of the buckling rate.

3. The method according to claim 2, wherein the step of terminating is performed immediately after a change occurs in the operational sign of the buckling rate.

\* \* \* \* \*